(12) United States Patent
Romanek

(10) Patent No.: US 6,443,177 B2
(45) Date of Patent: Sep. 3, 2002

(54) DEVICE FOR VENTING A FUEL TANK

(75) Inventor: Christian Romanek, Noailles (FR)

(73) Assignee: I.T.W. de France, Beauchamp (FR)

( * ) Notice: Subject to any disclaimer, the term of this patent is extended or adjusted under 35 U.S.C. 154(b) by 0 days.

(21) Appl. No.: 09/736,227

(22) Filed: Dec. 15, 2000

(30) Foreign Application Priority Data

Dec. 17, 1999 (FR) .......................................... 99 15989

(51) Int. Cl.$^7$ .............................................. F16K 24/04
(52) U.S. Cl. ........................................ 137/202; 137/43
(58) Field of Search ................... 137/43, 202

(56) References Cited

U.S. PATENT DOCUMENTS

| | | | |
|---|---|---|---|
| 5,640,989 A | | 6/1997 | Nemoto et al. |
| 5,666,989 A | * | 9/1997 | Roetker ...................... 137/202 |
| 5,944,044 A | * | 8/1999 | King et al. .................. 137/202 |
| 5,960,817 A | | 10/1999 | Johansen et al. |
| 5,960,819 A | * | 10/1999 | Weissinger et al. ..... 137/202 X |

FOREIGN PATENT DOCUMENTS

| | | | | |
|---|---|---|---|---|
| EP | 0 724 098 | * | 7/1996 | ................. 137/202 |
| FR | 2774636 | | 8/1999 | |
| JP | 9-42508 | | 2/1997 | |
| JP | 11-13572 | | 1/1999 | |
| WO | WO 99/61275 | | 12/1999 | |

OTHER PUBLICATIONS

King et al.; "Tank Venting Control System"; Nov. 12, 1998; Publication No. WO 98/50717.

* cited by examiner

Primary Examiner—Gerald A. Michalsky
(74) Attorney, Agent, or Firm—Lowe Hauptman Gilman & Berner, LLP

(57) ABSTRACT

A device (10) for venting a fuel tank has a chamber (17) communication on the one had with the tank and on the other hand, through an outlet orifice (19), with a pipe (20) for opening to atmosphere. A float (25) has an external skirt (27) delimiting an internal space in the float (25) and a needle (28) adapted to close off the outlet orifice (19) when the fuel level exceeds a predetermined threshold in the chamber (17). The float (25) has a least one partition (29) adapted to divide the internal space in the float (25), with a height substantially equal to the height of the external skirt (27).

21 Claims, 3 Drawing Sheets

DEVICE FOR VENTING A FUEL TANK

FIELD OF THE INVENTION

The present invention concerns a device for venting a fuel tank, notably for a motor vehicle.

The purpose of venting the fuel tank of a motor vehicle is to prevent any overpressure or negative pressure in the tank. A device for opening to atmosphere is thus provided on the tank in order to preserve a reasonable internal pressure in it, whatever the external temperature and altitude at which the tank is situated.

BACKGROUND OF THE INVENTION

The tank is thus prevented from deforming significantly, notably under negative pressure.

Thus, as the tank gradually empties of its fuel, it is necessary to admit air inside the tank in order to prevent the pressure from dropping excessively. On the other hand, when the reservoir is exposed to a high rise in temperature, for example when the vehicle is parked in the sun, the vapour pressure contained in the tank can increase greatly and it is then necessary to discharge some of these vapours to the outside.

In addition to this function of venting the tank, it is also necessary to provide means for preventing the fuel being able to emerge through the device for venting when the level of fuel close to this device increases significantly, for example following acceleration undergone by the vehicle, or if this vehicle turns over.

A device for venting a fuel tank is known, as described in the French patent application FR 98 06727, which has a chamber communicating on the one hand with the tank and on the other hand, through an outlet orifice, with a pipe for opening to atmosphere.

In order to provide a system for preventing leakage of fuel under all running conditions, and if necessary when the vehicle turns over, this device for venting has a float, housed in a chamber, adapted to force a needle upwards when the level of fuel reaches the device, the needle then closing off the orifice so as to prevent any leakage of fuel to the outside.

As illustrated in FIG. 1, such a device for venting is generally incorporated in a top wall 11 of the fuel tank 2.

The device for venting thus occupies the space separating the fuel tank 2 from the chassis 3 of the vehicle.

In addition, a minimum distance G must separate the bottom of the tank 2 from the ground 4.

Finally, a safety distance m is provided between the device for venting 1 immersed in the tank 2 and the maximum level M of fuel in this tank when the vehicle is stopped.

These technical constraints related to the mounting of the reservoir 2 in the vehicle, between the chassis 3 and ground 4, limit the space available for the device for opening to atmosphere.

SUMMARY OF THE INVENTION

The purpose of the present invention is notably to reduce the overall bulk of a device for venting a fuel tank.

To this end, the present invention relates to a device for venting a fuel tank having a chamber communicating on the one hand with the tank and on the other hand, through an outlet orifice, with a pipe for opening to atmosphere, and a float, housed in the chamber, having an external skirt delimiting an internal space in the float and a needle adapted to close off the outlet orifice when the fuel level exceeds a predetermined threshold in the chamber.

In accordance with the invention, the float has at least one partition adapted to divide up the internal volume of the float, with a height substantially equal to the height of the external skirt.

This internal partitioning of the float thus increases the useful flotation volume when the surface of the fuel in contact with the float is no longer strictly horizontal in the reservoir, that is to say during acceleration or braking phases or when the vehicle is going round bends, climbing or descending.

This is because the operation of the float is assured by virtue of the internal volume of this float capable of containing a gaseous volume coming from the emanation of fuel vapours.

By increasing the useful flotation volume, it is possible to reduce the overall height of the float, for an external skirt diameter equivalent to the usual diameter.

By thus reducing the height of the float, the overall bulk of the device for venting is also reduced along with the space necessary for fitting it between the vehicle chassis and the tank.

According to a preferred characteristic of the invention, the external skirt of the float and the partition are concentric.

This partition arrangement thus makes it possible to divide up the internal volume of the float in all directions around its axis of movement.

Thus the useful flotation volume in the float is increased whatever the direction in which the level of fuel is sloping in the tank.

According to one advantageous characteristic, the float has several concentric partitions, thus creating several compartments within the float.

Alternatively, according to another characteristic of the invention, the external skirt of the float and the partition are perpendicular, which makes it possible to divide up the internal volume of the float in specific directions.

In a practical embodiment of the invention, the float has a first series of concentric partitions delimiting annular internal volumes in the float, and a second series of partitions, perpendicular to the partitions in the first series and adapted to divide up the annular internal spaces.

The arrangement of partitions, both concentric and perpendicular, makes it possible to increase the number of compartments partitioning the internal space of the float, and thus to increase the useful flotation volume of this float.

The Applicant estimates that it was thus possible to reduce the total height of the float by approximation 30%.

According to a characteristic which is particularly simple to implement, the float has a tubular external skirt and at least one internal tubular partition.

Other particularities and advantages of the invention will also emerge from the following description.

BRIEF DESCRIPTION OF THE DRAWINGS

In the accompanying drawings, given by way of non-limitative example.

DETAILED DESCRIPTION OF THE INVENTION

Figure 1:
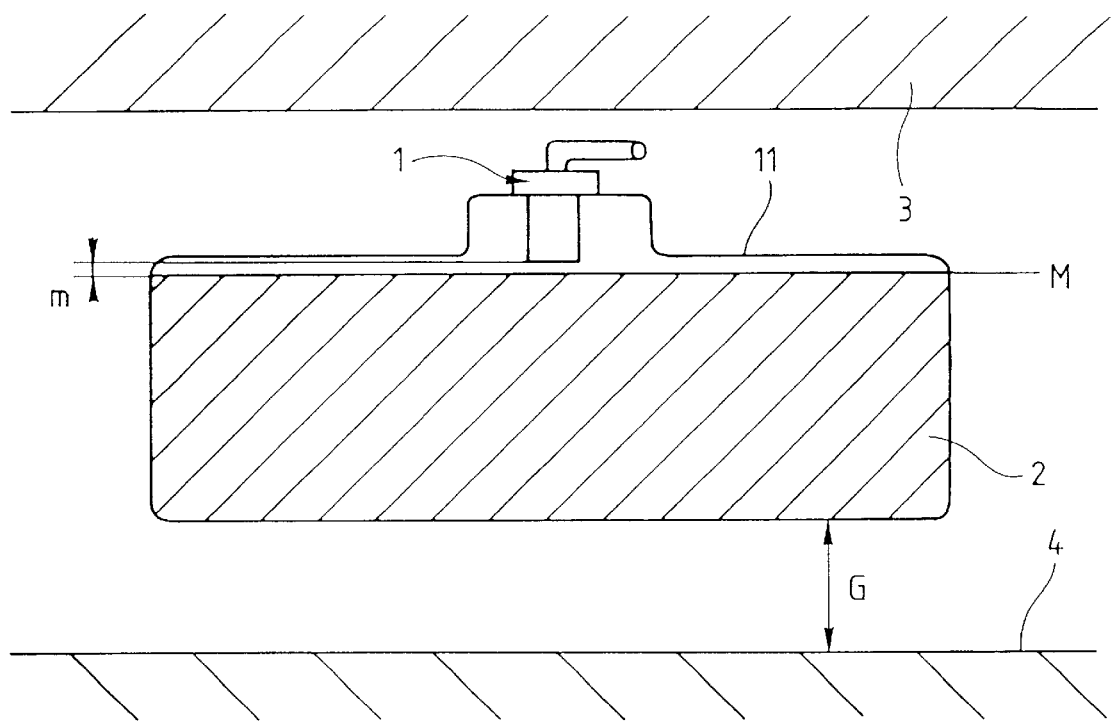
FIG. 1 illustrates schematically the arrangement of a device for opening a fuel tank to atmosphere in a motor vehicle.

A description will be given first of all, with reference to FIG. 2, of a device 10 for venting a motor vehicle fuel tank according to a first embodiment of the invention.

This device 10 is placed at the top part of a fuel tank 2, a top wall 11 of which, when the vehicle is in a normal position on horizontal ground, is substantially horizontal, has been shown in part.

The device 10 thus has a housing 12 which extends partly outside the tank and partly inside it, by virtue of an opening 13 provided in the top wall 11 of the tank.

The housing 12 has essentially a cylindrical barrel 14 which extends through the orifice 13 towards the inside of the tank.

This cylindrical barrel 14 is closed on the one hand by a transverse top wall 15, with an outlet orifice in it, and by a bottom transverse wall 16.

A chamber 17 is thus defined by the cylindrical barrel 14 and the two transverse walls 15, 16.

In this example, and non-limitatively, the bottom transverse wall 16 is produced in the form of an attached piece fixed for example by clipping to the inside of the barrel 14.

This bottom transverse wall 16 has at least one orifice 18 (two in number in FIG. 2), which enables the chamber 17 to communicate with the tank.

This bottom transverse wall 16, thus with orifices 18 in it, slows down the fuel before it enters the chamber 17.

The top transverse wall 15 also has an outlet orifice 19, situated in this example substantially at the centre of the chamber 17.

By virtue of this outlet orifice 19, the chamber 17 can communicate with a pipe for opening to atmosphere 20.

This top transverse wall 15 has substantially a tapered shape, which opens out towards the top, the outlet orifice 19 opening out at the centre of this tapered part.

This top transverse wall 15 is extended upwards by a cylindrical wall 21.

The housing 12 also has a part forming a cap 22 covering this cylindrical wall 21.

An intermediate chamber 23 is thus defined by this cap 22, the cylindrical wall 21 and the top transverse wall 15.

The pipe for opening to atmosphere 20 opens out in this intermediate chamber 23 by virtue of orifices provided for this purpose in the cap 22 and cylindrical wall 21.

A ball 24 is housed in this intermediate chamber 23.

This ball 24 has a diameter sufficient to close off the outlet orifice 19 in the transverse wall 15.

When the vehicle is in the normal position, the ball 24 is, by gravity, in contact with the tapered surface of the top transverse wall 15 and, when the vehicle is at rest, this ball 24 closes off the outlet orifice 19.

The device for opening to atmosphere 10 also has a float 25 mounted so as to be able to move in the chamber 17.

This float 25 has essentially a top transverse wall 26 and an external tubular skirt 27 delimiting an internal space in the float.

The float 25 is thus essentially a tubular body with a substantially vertical axis A which is open at its bottom end and closed at its top end.

The top face of the top transverse wall 26 carries a needle 28 which is substantially conical and tapered towards the top. This needle 28 is intended to close off the outlet orifice 19 when the float 25 is in a closure position, that is to say when the float 25 is close to the top transverse wall 15 of the chamber 17.

In accordance with the invention, this float 25 has partitions 29 adapted to divide up the internal space of the float 25.

Figure 3:
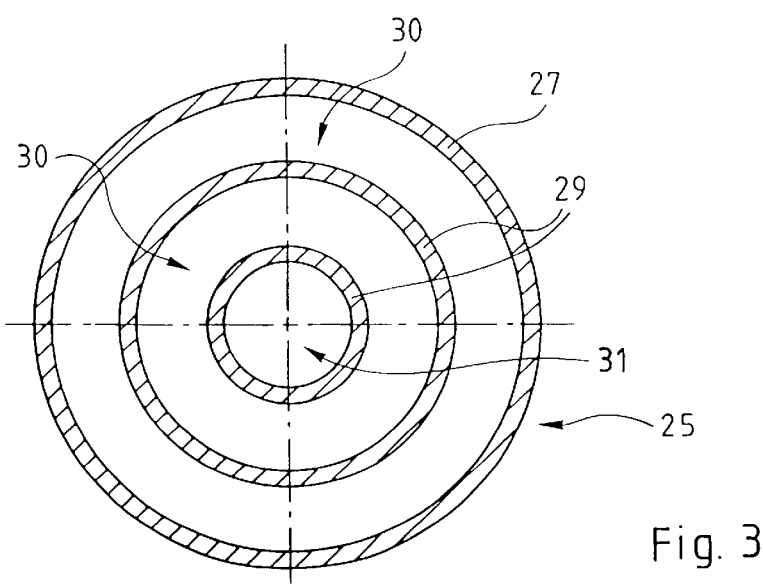
FIG. 3 is a view in transverse section of the float of FIG. 2.

In this embodiment, the external skirt 27 of the float 25 and the partitions 29 are concentric, as better illustrated in FIG. 3.

The height of these partitions 29 and of the external skirt 27 of the float 25 are substantially equal.

As better illustrated in FIG. 3, in this preferred embodiment, the float 25 has two concentric partitions 29 thus defining two annular internal spaces 30 inside the float 25 and a cylindrical central space 31.

These partitions 29 are thus in this example two tubular cylindrical collars 29 with the same axis as the axis A of the float 25 and which extend downwards from the bottom face of the top transverse partition 26 of the float 25.

The length along the axis A of the float 25 of these partitions 29 is equal to the length of the external skirt 27 so that the end 27a of the external skirt 27 and the ends 29a of the partitions 29 are situated substantially in the same plane, this plan being perpendicular to the axis A of the float 25.

Figure 4:
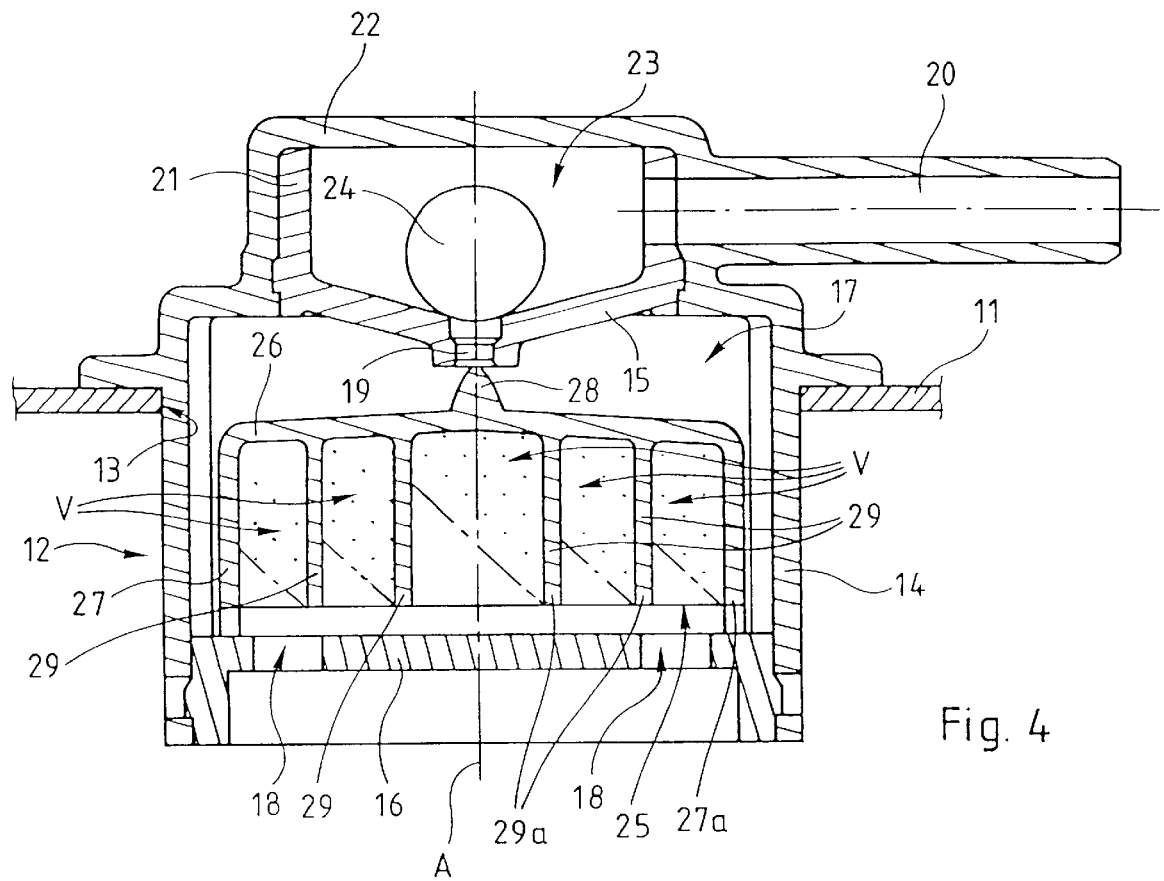
FIG. 4 is a view in longitudinal section of a device for opening to atmosphere in accordance with a second embodiment of the invention.
Figure 5:
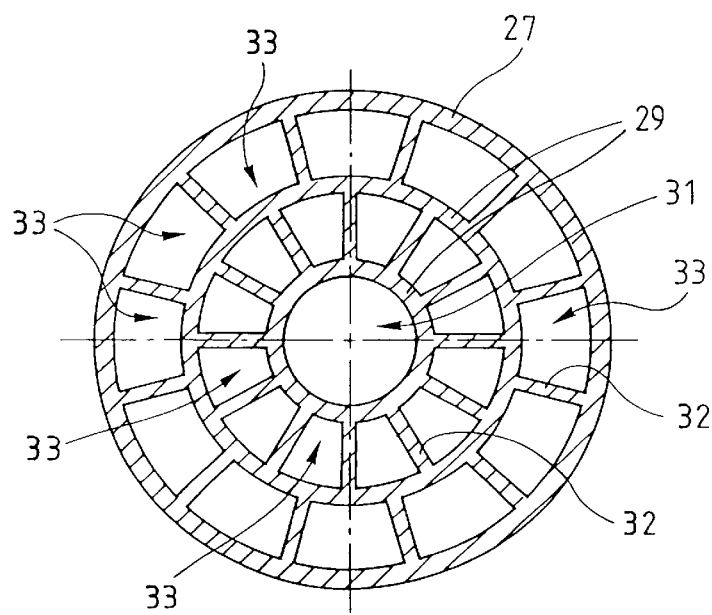
FIG. 5 is a view in transverse section of the float of FIG. 4.

FIGS. 4 and 5 illustrate a second embodiment of the invention.

In these figures, the device for venting 10 is in every respect identical to that described with reference to FIGS. 2 and 3, apart from the structure of the float 25, which will be detailed below.

The float 25 has as before a top transverse partition 26 extended downwards by an external tubular skirt 27.

It also comprises intermediate partitions 29, two in number in this example, with a cylindrical tubular shape and concentric with the external skirt 27.

In this embodiment, the float 25 also has a second series of partitions 32, perpendicular to the concentric partitions 29, and adapted to divide up the annular internal spaces 30 defined by the concentric partitions 29 and the external skirt 27.

Preferably, as illustrated in FIG. 5, this second series of partitions 32 includes a series of radial partitions disposed at a regular pitch in each annular space 30.

In this embodiment, the radial partitions 32 of the adjacent annular spaces 30 are disposed so as to be staggered with respect to each other.

The concentric partitions 29 and the radial partitions 32 thus define a series of compartments 33 inside the float 25.

The concentric partitions 29 and the radial partitions 32 have a length, as from the top transverse partition 26 of the float 25, equal to the length of the external skirt 27.

A description will now be given more particularly of the functioning of the device for venting 10 according to the invention.

When the vehicle is at rest on a substantially horizontal surface, the ball 24 closes off the outlet orifice 19 so that there is no communication between the inside of the tank 2 and the circuit for opening to atmosphere to which the pipe 20 for opening to atmosphere is connected.

On the other hand, as soon as an overpressure occurs inside the tank, for example due to a heating of the gases contained in it, or when the vehicle travels, simply because of the vibration which is inevitably transmitted to the tank and to the device for venting 10, the ball 24 is moved so that the outlet orifice 19 is released.

Thus the gases can circulate freely through the chamber 17, the intermediate chamber 23 and the pipe 20 for opening to atmosphere.

The device 10 for venting thus in a first function preserves an internal pressure in the tank within an acceptable range of pressures.

Moreover, it happens that the level of fuel in the tank, close to the device 10 for opening to atmosphere, becomes higher than the level of the bottom transverse wall 16 of the housing 12.

Such a case may arise for example when the vehicle is resting on a surface having a high declivity or during acceleration, braking or on a bend.

In these cases, the ebb and flow of the fuel inside the tank under running conditions is such that the surface of the fuel is generally sloping, for example, as illustrated, at approximately 45° with respect to the axis A of the device 10 for venting.

Figure 2:
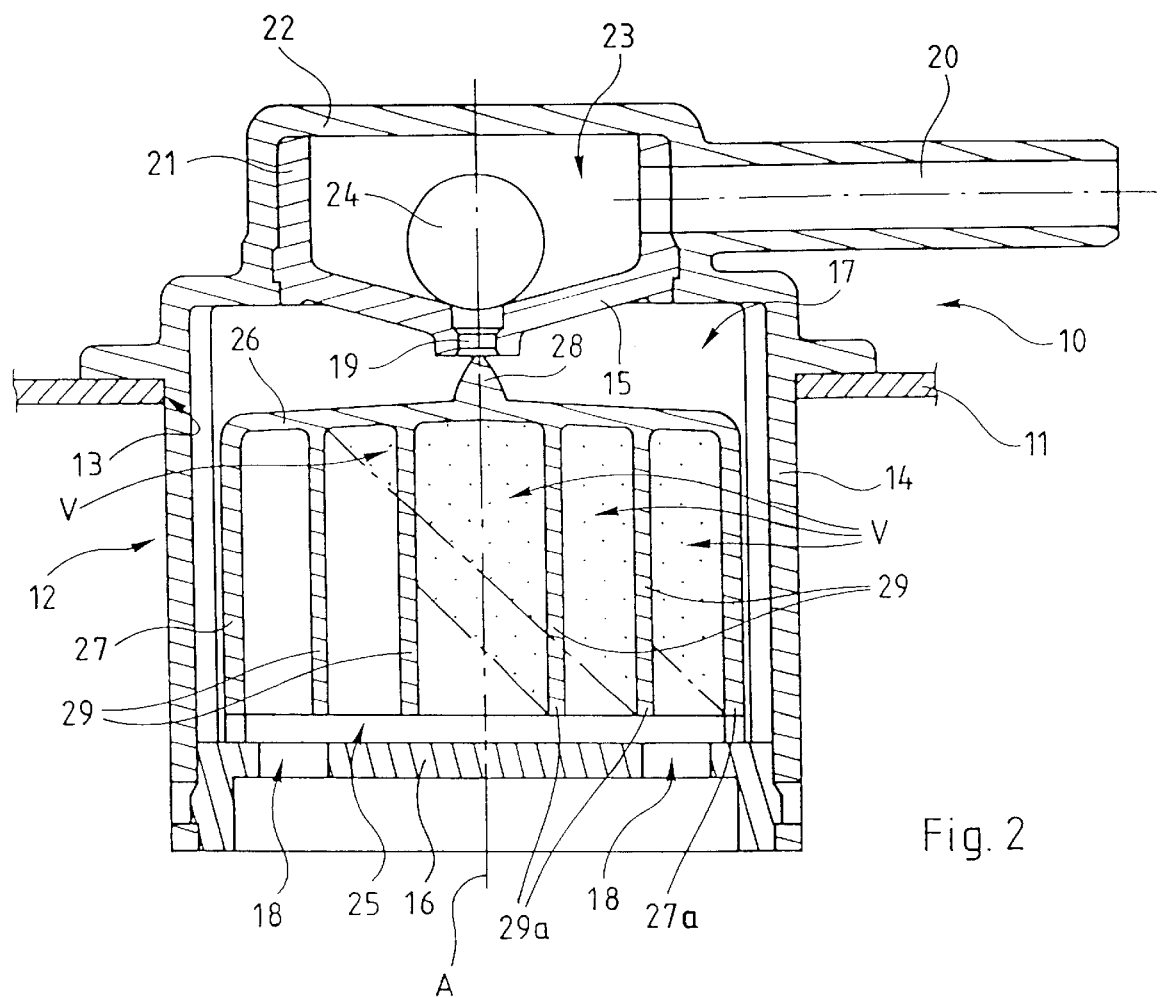
FIG. 2 is a view in longitudinal section of a device for opening to atmosphere according to a first embodiment of the invention.

Such a situation is illustrated in FIGS. 2 and 4, in which the surface of the fuel is shown aslant in the float 25, by dot and dash lines.

Under these conditions of use, the device for opening to atmosphere must under no circumstances allow a leakage of fuel whatever the running conditions, and if applicable when the vehicle turns over.

Since the fuel can enter inside the chamber 17, through orifices 18 in the bottom transverse wall 16 of the housing 12, the fuel also enters inside the external skirt 27 of the float 25.

However, as soon as the level of fuel is sufficient inside the float 25, the fuel encloses, within this float 25, a volume of gas V which is included between the fuel surface, the external skirt 27 and the top transverse partition 26 so that the float 25 is pushed upwards inside the chamber 27 and the needle 28 closes off the outlet orifice 19, thus preventing any risk of escape of fuel through this orifice 29 in the direction of the pipe 20 for opening to atmosphere.

In accordance with the invention, by compartmentalising the internal space of the float 25, the useful flotation volume is increased, that is to say the gaseous volume V trapped between the surface of the fuel, the top transverse partition 26, the skirt 27 and the concentric partitions 29, and possibly the radial partitions 32.

This is because, without internal partitions 29, 32, the useful flotation volume is defined solely by the skirt 27, the top transverse partition 26 and the surface of the fuel sloping from the bottom end 27a of the external skirt 27.

On the other hand, the presence of the internal partitions 29, 32 makes it possible to trap gas in each compartment 30, 31, 33 since the surface of the fuel comes in contact with the bottom ends 29a of the internal partitions 29, 32.

It is thus possible, considering a float 25 with the same external diameter, to reduce the overall height of the float 25 according to the invention.

The addition of supplementary partitions 29 and 32 makes it possible to reduce the height of the float 25 by approximately 30% compared with a conventional float.

It is thus possible to reduce the overall bulk of the device 10 for venting, which facilitates its mounting within a motor vehicle.

Naturally, many modifications could be made to the example embodiments described above without departing from the scope of the invention.

Thus the float 25 could have a single concentric supplementary partition 29, or on the other hand concentric partitions 29 greater than two in number.

Moreover, the float 25 could have only partitions 32 perpendicular to the external skirt 27, to the exclusion of any concentric partition 29. It could thus have one or more partitions disposed along a diameter of the external skirt 27.

The float 25 and the whole of the device 10 could also have a shape other than tubular.

What is claimed is:

1. Device for venting a fuel tank, comprising:
    a chamber communicating with the tank and, through an outlet orifice, with a pipe opening to atmosphere;
    a valve body member disposed between the outlet orifice and the pipe for selectively closing the outlet orifice from outside; and
    a float housed in the chamber and comprising
        a transverse top wall;
        an external skirt extending downwardly from the top wall and delimiting, together with the top wall, an internal space in the float;
        a needle member disposed on top of the top wall and adapted to close off the outlet orifice from inside when a fuel level exceeds a predetermined threshold in the chamber; and
        at least one partition dividing up the internal space in the float and having a height substantially equal to that of the external skirt.

2. Device for venting according to claim 1, wherein the external skirt of the float and said at least one partition are concentric.

3. The device of claim 2, wherein said at least one partition comprises a plurality of concentric partitions.

4. Device for venting according to claim 1, wherein said at least one partition comprises a plurality of concentric partitions.

5. Device for venting according to claim 1, wherein the external skirt of the float and said at least one partition are perpendicular.

6. Device for venting according to claim 1, wherein said at least one partition comprises a first series of concentric partitions, and a second series of radial partitions, perpendicular to the partitions in the first series.

7. The device of claim 6, wherein the external skirt and the partitions in the first series are concentric.

8. The device of claim 6, wherein the external skirt and the partitions in the first series are tubular.

9. The device of claim 6, wherein the valve body member comprises a ball.

10. The device of claim 9, wherein the outlet orifice is formed in a middle portion of a top wall of the chamber a peripheral portion of which is slanted radially inwardly towards the middle portion.

11. Device for venting according to claim 1, wherein the external skirt and said at least one partition are tubular.

12. The device of claim 11, wherein the external skirt and said at least one partition are concentric.

13. The device of claim 1, wherein the internal space is entirely closed at the top by the top wall.

14. A device for venting a fuel tank, comprising:
    a chamber communicating at the bottom with the tank and at the top, via an outlet orifice, with a pipe opening to atmosphere; and a float housed in the chamber and comprising:
- a transverse top wall;
- an external skirt extending downwardly from the top wall and defining, together with the top wall, an internal space in the float, whereby the internal space is entirely closed at the top by the top wall;
- a needle member disposed on top of the top wall and adapted to close off the outlet orifice when a fuel level in the chamber exceeds a predetermined threshold; and
- at least one radial partition extending downwardly from the top wall and dividing up the internal space of the float;

wherein lower end portions of the external skirt and said at least one radial partition are positioned substantially on the same plane.

15. The device of claim 14, wherein the external skirt is tubular.

16. The device of claim 14, further comprising at least one inner skirt extending downwardly from the top wall, circumferentially and in inwardly spaced relation with respect to the external skirt.

17. The device of claim 16, wherein a lower end portion of the inner skirt is positioned substantially on said plane.

18. The device of claim 14, further comprising at least first and second inner skirts extending downwardly from the top wall, circumferentially and in inwardly spaced relation with respect to each other and the external skirt, said at least one radial partition comprises at least first and second sets of radial partitions connecting the first and second inner skirts and the second inner skirt and the external skirt, respectively, the radial partitions in the first and second sets are arranged in a staggered manner with respect to each other.

19. The device of claim 18, wherein lower end portions of the first and second inner skirts are positioned substantially on the same plane as those of the radial partitions in the first and second sets and the external skirt.

20. The device of claim 19, wherein the first and second inner skirts and the external skirt are equally spaced while the radial partitions in the first and second sets are uniformly circumferentially distributed.

21. The device of claim 19, wherein the first and second inner skirts and the external skirt are cylindrical and the radial partitions in the first and second sets extend perpendicularly to the skirts.

* * * * *